United States Patent

Cohen et al.

[15] 3,699,244

[45] Oct. 17, 1972

[54] APPARATUS TO MATCH THE COLOR OF A MONOCHROME DISPLAY TO AVERAGE COLOR OF AN ADJACENT FULL COLOR DISPLAY

[72] Inventors: Edwin Cohen, Binghamton; John C. Altmiller, Kirkwood, both of N.Y.

[73] Assignee: The Singer Company, Binghamton, N.Y.

[22] Filed: Aug. 23, 1971

[21] Appl. No.: 173,843

[52] U.S. Cl. ......178/5.4 R, 178/DIG. 35, 178/7.3 D, 35/12 N

[51] Int. Cl. ............................H04n 9/12, H04n 5/58

[58] Field of Search ...178/5.4 R, 7.3 R, 7.5 R, 5.2 R, 178/5.4 ML, 5.4 HE, DIG. 35, DIG. 23, DIG. 13, 7.3 D, 7.5 D; 35/12 R, 12 N

[56] References Cited

UNITED STATES PATENTS

| | | | |
|---|---|---|---|
| 3,557,470 | 1/1971 | Emerick et al | 35/12 N |
| 3,612,761 | 10/1971 | Wolff | 178/DIG. 35 |

FOREIGN PATENTS OR APPLICATIONS

| | | | |
|---|---|---|---|
| 1,236,222 | 6/1960 | France | 178/7.86 |

*Primary Examiner*—Robert L. Richardson
*Attorney*—Francis L. Masselle et al.

[57] ABSTRACT

Apparatus, for use in a display system wherein a central high resolution color image is supplemented by crude monochrome display, which senses the average color in the high resolution display and adds that color to the monochrome display is shown. Two embodiments for use with projected images are described. One in which the sensed color is provided by passing the light through a C.I.E. diagram positioned by the sensed color signals to obtain a matching color and a second in which controlled amounts of light are mixed to obtain the color. An embodiment for use with a CRT displays in which the three color video signals are averaged of a line on the high resolution display and the average provided to the monochrome displays is also shown.

17 Claims, 8 Drawing Figures

Edwin Cohen
and John C Altmiller INVENTORS
BY
John C Altmiller
AGENT

Edwin Cohen INVENTORS
and John C. Altmiller

BY John C Altmiller

AGENT

INVENTORS.
Edwin Cohen and John C. Altmiller
BY
John C. Altmiller
AGENT

Edwin Cohen and John C. Altmiller INVENTORS.

BY John C. Altmiller

AGENT

INVENTORS.
Edwin Cohen and John C. Altmiller
BY
John C. Altmiller
AGENT

Edwin Cohen and John C. Altmiller INVENTORS.
BY John C. Altmiller
AGENT

APPARATUS TO MATCH THE COLOR OF A MONOCHROME DISPLAY TO AVERAGE COLOR OF AN ADJACENT FULL COLOR DISPLAY

This invention relates to simulator visual display systems and more particularly to a method of providing the appropriate color to monochromatic peripheral displays.

In simulators and trainers such as those used to train pilots and drivers, visual systems which present to the trainee a scent representing part of the real world are becoming more important. One limitation on most present systems is that the only high resolution image that may be generated economically is the one with a relatively narrow field of view. For example, with film systems the field of view does not normally fill more than 45 by 60 degrees. Yet the trainee in normal operation may be able to observe areas much in excess of this and may depend on such views for cues. Thus, simulation may be improved by filling in the areas outside the central area, which has a high resolution, full color motion picture (or TV or other display) with a crude monochrome system that provides horizon reference cues, etc.

If such a crude monochrome display is utilized it will provide much better simulation if it is in a color which is matched to that of the high resolution full color image. The present invention provides a method for matching the color of such a monochrome display adjacent to a high resolution full color display to that of the high resolution full color display.

It is a principal object of this invention to provide apparatus for matching the color of a monochrome display to that of a high resolution full color display.

Another object is to provide such apparatus wherein the average color of the entire high resolution full color image is not sensed, but a weighting by area is effected, so that the monochrome image color is matched to the edges of the high resolution full color image.

An additional object is to provide such apparatus which is particularly useful in simulator visual display systems.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
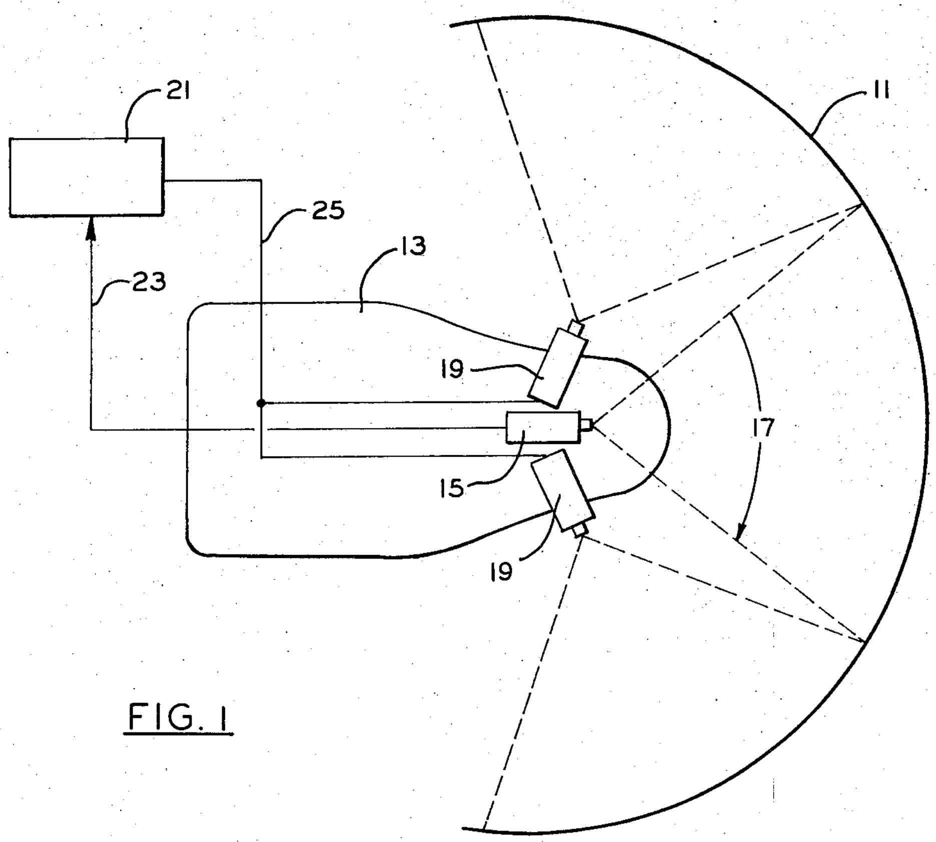
FIG. 1 is a block diagram of a specific type of simulator display system using the apparatus of the present invention.

FIG. 1 illustrates a system wherein the present invention may be used. A screen 11 is positioned for viewing by a trainee/observer in a simulator cockpit 13. A projector 15 is located atop the cockpit 13 and arranged to project a full color picture on screen 11. The horizontal field of the picture projected is represented by angle 17. It is apparent that the sides of the screen, outside of the area covered by the image from projector 15, will be visible the trainee in cockpit 13.

Image generators 19 are used to fill in this remaining portion with a low resolution image such as a horizon, with grid lines providing a perspective illusion below the horizon. The system of the present invention provides a color to this low resolution imagery which will substantially match the color from projector 15. The color of the image being projected by projector 15 is sensed in a manner to be described below and provided to a computer 21 on line 23 which will provide control signals to the color generating portions of image generators 19 on line 25. Additional projectors or image generators may be provided to supply sky color, in which case projectors 19 would only fill in the area below the horizon.

Figure 2:
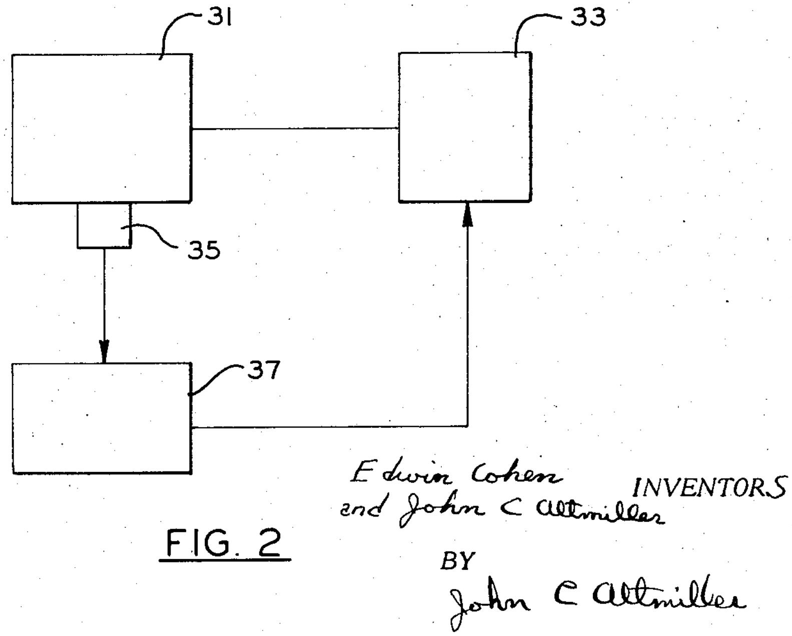
FIG. 2 is a general block diagram of the type of system in which the present invention may be used.

The system of FIG. 1 is shown only as an example. FIG. 2 is a block diagram of a more general nature, showing basic elements of the type of system in which the present invention may be used. Image generator 31 will supply a high resolution full color image to a display system 33. Sensing means 35 will sense the average color in the image generated and provide signals to the computer and fill-in image generator 37. The fill-in image generator in block 37 will then provide a fill-in color to display system 33 to cover the areas not covered by image generator 31.

The image generator may be a motion picture projector and the display screen as shown in FIG. 1. The display may be a rear projection screen with or without infinity imaging optics rather than a front projection screen. The image generatory may, alternatively, be a television camera viewing a motion picture film or scale model and the display one or more CRTs or TV projectors, again with or without infinity imaging optics.

Figure 3:
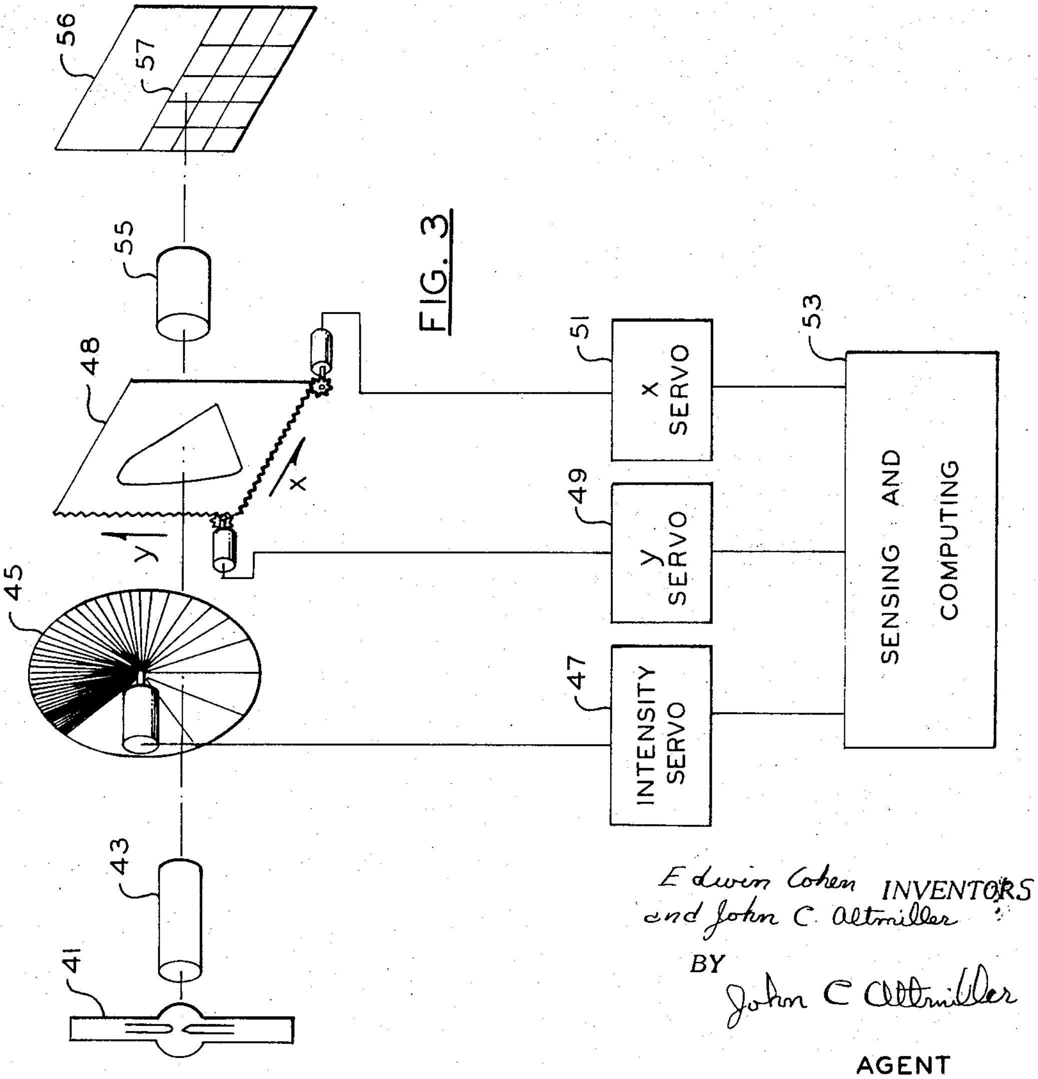
FIG. 3 is a preferred embodiment of the present invention for use where a projected display is used.

FIG. 3 shows a view of a first embodiment of the present invention for use where the high resolution image is a projected picture. A light source 41 is collimated by optics 43 to form a narrow beam of light (alternately, a laser might be used). This light is passed first through neutral density filter 45, shaped as a disk with density varying as a function of angle. Disk position is controlled by an intensity servo 47, a conventional position servo, the input of which is obtained in a manner to be described below by sensing and computing block 53. The light is then passed through a color filter in the form of a standard C.I.E. chromaticity diagram 48 mounted on a conventional servoed X–Y table. The C.I.E. diagram is shown on FIG. 4 and will contain mixtures of all possible colors. A comprehensive description of the C.I.E. tri-stimulus method employing the chromaticity diagram may be found on page 48 in Fundamentals of Light and Lighting by Karl A. Staley (Large Lamp Dept., General Electric, 1960). A color on the diagram is defined by the equations:

$$x = X/(X+Y+Z)$$

$$y = Y/(X+Y+Z)$$

$x$ is the $X$ position on the diagram;
$Y$ is the $Y$ position on the diagram;
$X$ is the amount of red;
$Y$ is the amount of green; and
$Z$ is the amount of blue.

The $x$ and $y$ of the $X-Y$ table are driven, respectively, by servos 49 and 51 which obtain their inputs from the sensing and computing means of block 53 in a manner to be described below. The light of the desired color is then provided from C.I.E. diagram 48 to a projection lens 55 which causes it to act as a point source over the desired field of view. A mask 56 which contains grid lines and a horizon 57 is placed in front of the effective point source to provide ground and horizon reference.

It is beyond the scope of this description to discuss in detail the methods and apparatus required for point light source image generators. However, it will be evident to those skilled in the art that the filter 45 and C.I.E. diagram 48 may be used in the types of systems described in U.S. Pat. No. 2,961,778 granted to L. DeFlorez et al on Nov. 29, 1960 and 3,089,256 granted to J. W. Long on May 19, 1963. It is only necessary that the filter 45 and C.I.E. diagram 48 be interposed between the light source and grid or other image to be projected. It is also evident from an examination of the DeFlorez patent wherein separate sky and ground images are used, that the system of the present invention may be used for ground fill-in only with a separate image generator providing sky scenes.

Figure 5:
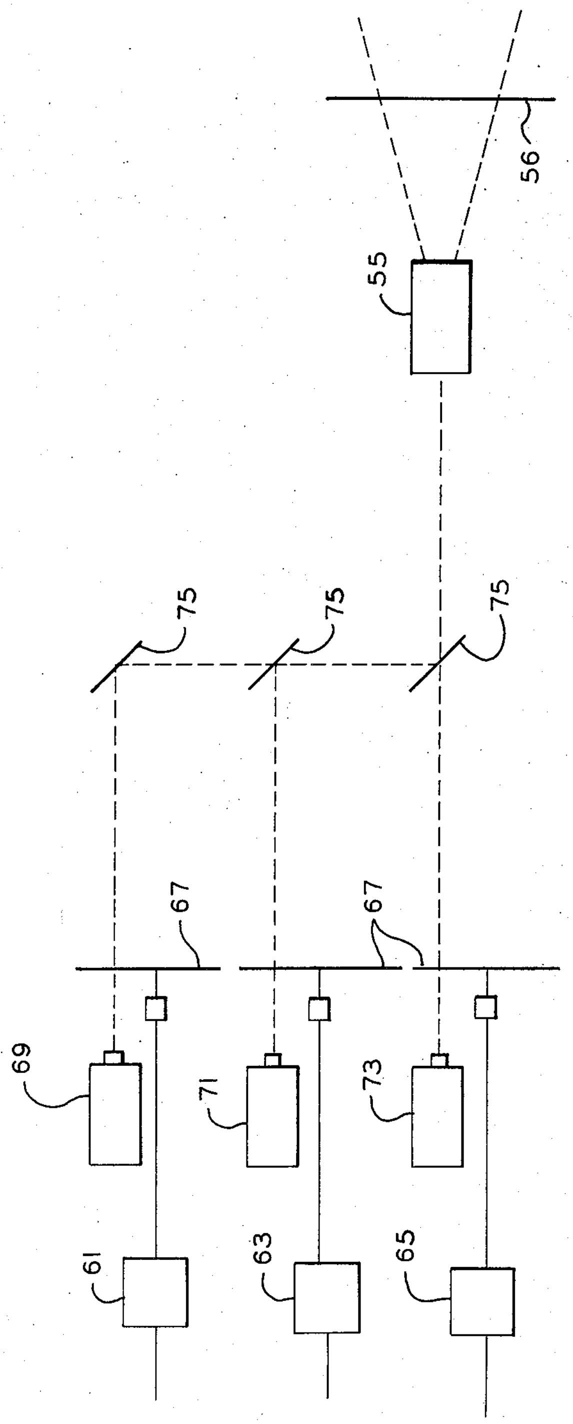
FIG. 5 is a second embodiment of the present invention for use with a projected display.

A second embodiment is shown in FIG. 5. Signals commensurate with the desired amount of red, green and blue are provided, respectively, to servos 61, 63 and 65 which control the positions of neutral density filters 67, essentially the same as filter 45 of FIG. 3. Three separate light sources, a red source 69, a green source 71 and a blue source 73 are directed through the filters 67 and then combined by beam splitters 75 to form a beam of the desired color. Lens 55 and mask 56 are provided in the same manner.

These two embodiments are useful only where it is possible to project light onto a screen in the display system. Thus, they may be used with a film or TV projector. A means of providing matching fill-in color where CRTs are used in the display system will be described below following an explanation of the sensing and computing means of the embodiments of FIGS. 3 and 5.

Figure 6:
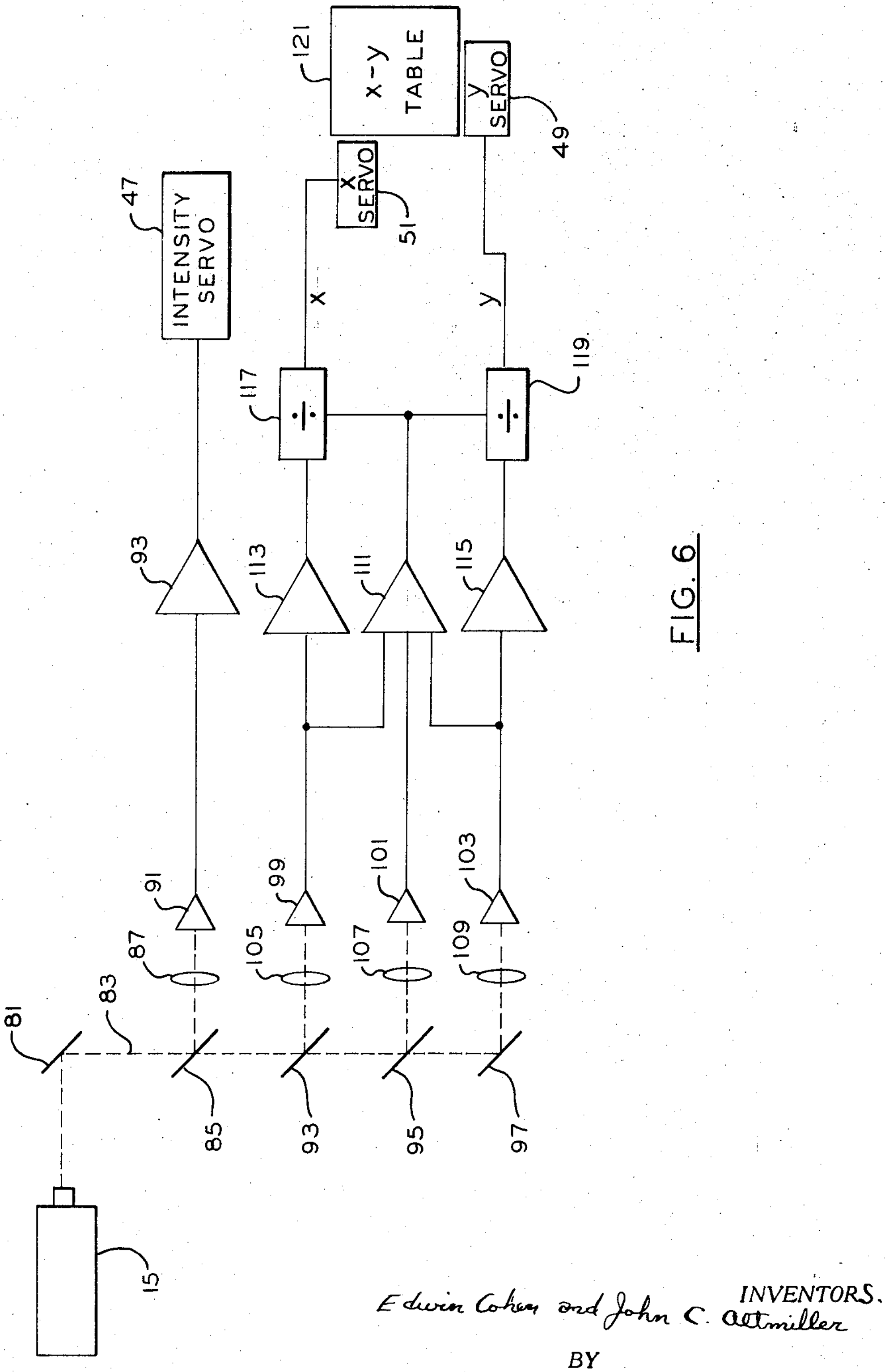
FIG. 6 is a block diagram of a preferred embodiment of the sensing and drive means of the embodiment of FIG. 3.

FIG. 6 shows projector 15 of FIG. 1 with a beamsplitter 81 in its projection path to direct a portion of the light along path 83. A second beam splitter 85 directs some light through a lens 87 to a photomultiplier 91, producing a signal which is provided through an amplifier 93 to intensity servo 47. The remaining light is passed through red, green and blue dichroic mirrors indicated respectively by reference numerals 93, 95 and 97. The resulting red, green, and blue light is directed respectively to photo multipliers 99, 101, and 103 through lens 105, 107 and 109. This portion of the system uses essentially the same techniques as are used in color television cameras to derive separate color signals.

Figure 4:
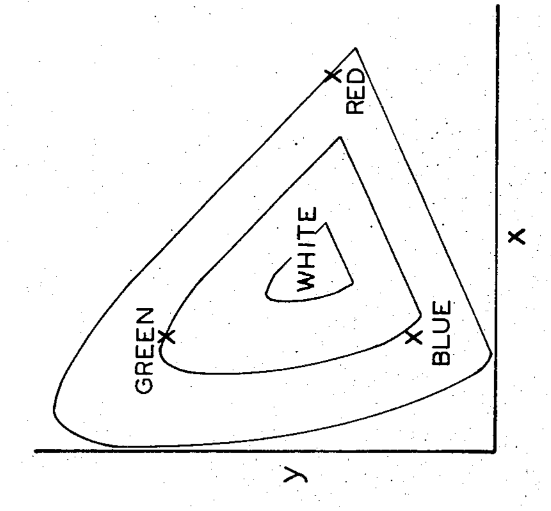
FIG. 4 is a C.I.E. chromaticity diagram of the type which may be used in the embodiment of FIG. 3.

The resulting signals from photo multipliers 99, 101, and 103, respectively, are the $X$, $Y$ and $Z$ of the equations described in connection with FIG. 4. These equations are solved to obtain $x$ and y by summing $X$, $Y$ and $Z$ in amplifier 111 and providing the $X$ and $Y$ signals, after signal conditioning and scaling in amplifiers 113 and 115, respectively, to analog dividers 116 and 119 (such as those manufactured by Analog Devices Corp. of Norwood, Mass.) where they are divided by the output of amplifier 111. The resulting $x$ and $y$ outputs are provided as position inputs to the servos 51 and 49 of X–Y table 121.

For use in the embodiment of FIG. 5, the signals from photomultipliers 99, 101, and 103 would be used directly (with possible scaling or signal conditioning)to drive the filter wheel servos 61, 63 and 65.

Very often the scene displayed by projector 15 will be of an airport runway in which case the color at the side of the picture, off the runway, will provide a better fill-in color for the monochrome display at that side. Thus, rather than sensing the whole picture, the edges only may be sensed. An alternate to this would be to sense the whole picture and derive an average with the sides providing a greater weight.

Figure 7:
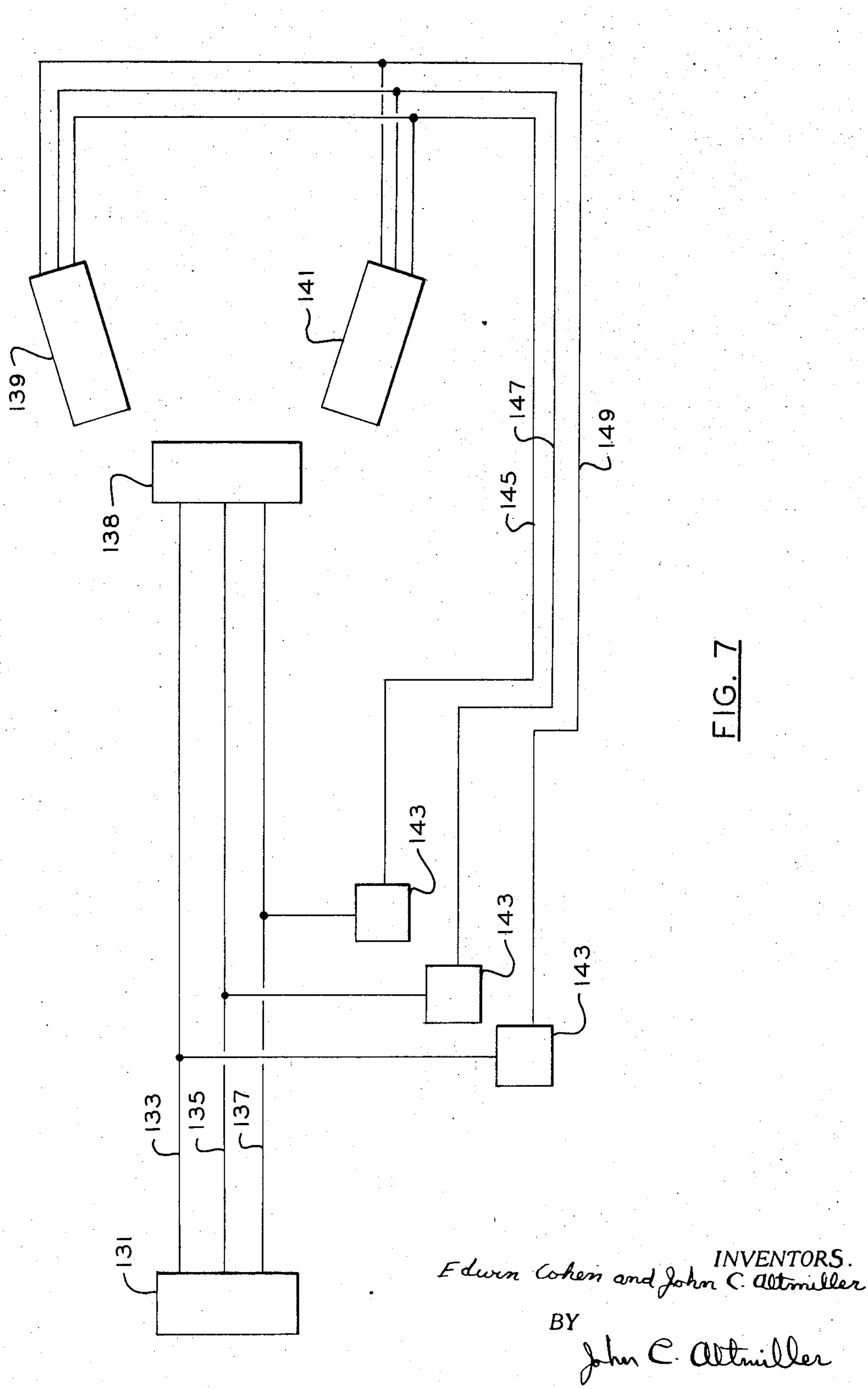
FIG. 7 is a block diagram of a preferred embodiment of the invention for use in a CRT visual display system.

FIG. 7 shows how the present invention may be used with a television display. The television camera 131 which generates the high resolution full color image will have red, green, and blue outputs on lines 133, 135 and 137 which will be provided to display 138. Since the image does not fill the desired field, additional TV displays 139 and 141 will be provided. These displays 139 and 141 may have images generated on them by a synthetic terrain generator such as that described in U.S. application Ser. No. 108,447 filed by M. Millard et al on Jan. 21, 1971. Color is provided to displays 139 and 141 by blocks 143.

Figure 8:
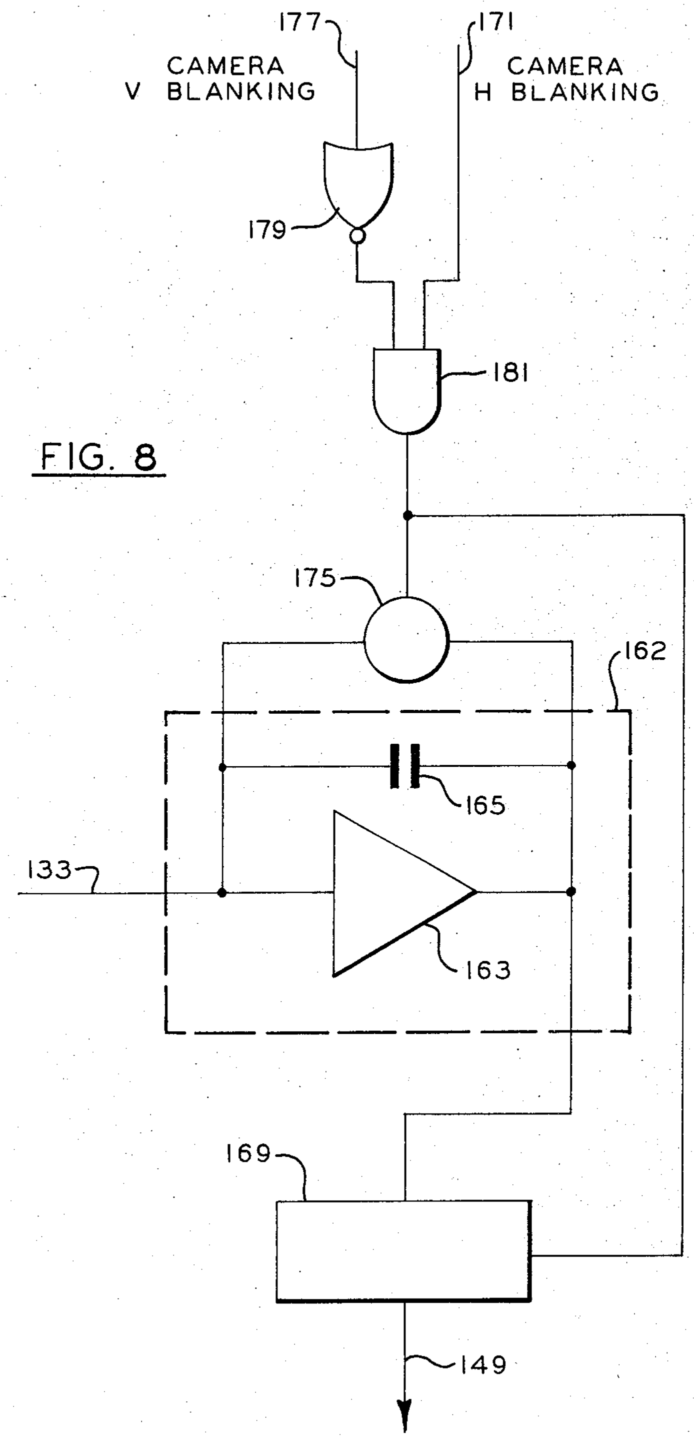
FIG. 8 is logic block diagram of sensing and control means for use with the embodiment of FIG. 7.

FIG. 8 shows an exemplary construction of the circuit of blocks 143 for the red signal on line 133 of FIG. 7. Similar circuits are used for blue and green. The red video signal will be provided on line 133 to an integrator 162 comprising amplifier 163 and capacitor 165. During the camera scan the signal on line 133 will be integrated by integrator 162. The output of integrator 162 is provided to a sample and hold circuit 169. When a camera horizontal blanking signal appears on line 171 it will be gated through 181 to cause circuit 169 to hold the output of integrator 162 and will close a switch 175 (such as a FET switch) across capacitor 165 and discharge the capacitor.

When the camera vertical scan is blanked a signal on line 177, inverted through NOR gate 179, will disable AND gate 181 and cause the last value to be held in circuit 169 until scanning resumes. The output on line 149 (shown also in FIG. 7) to the displays will therefore always reflect the average color on the previous line of the high resolution full color display. Thus, the average color will be provided for fill-in on a line-by-line basis, resulting in a better approximation of average color than is possible with the optical system. It will automatically match sky color when sky appears and ground color when ground appears. If only the edges are to be sensed the integration period may be shortened to cover only the edge by generating an artificial blanking pulse on line 171 a predetermined time after the start of camera horizontal scan.

Thus, a method of producing an improved fill-in display to supplement a high resolution color display has been shown. Although specific embodiments have been disclosed it will be evident to those skilled in the art that the method can be utilized in any system where monochrome imagery is used to supplement a full color display.

What is claimed is:

1. In a visual display system having a central high resolution color display and one or more monochromatic displays adjacent thereto, apparatus to add color to the monochromatic displays which will approximate the average color of the high resolution color display, or a portion thereof, comprising:

a. means to sense the average color of at least a portion of the high resolution display; and b. means to provide said sensed average color to the monochromatic displays.

2. The invention according to claim 1 wherein said sensing means sense the three primary colors in said display and provide outputs corresponding thereto.

3. The invention according to claim 2 wherein said displays are obtained by projecting images on a screen.

4. The invention according to claim 3 wherein said means to provide said sensed color comprise a color filter containing all possible color combinations on different sections thereof interposed in the projection path of said monochromatic displays, the color of said filter being a function of its position, and means to position said filter in response to said sensing means.

5. The invention according to claim 4 wherein said color filter is in the form of a C.I.E. diagram and said positioning means is a servo driven X–Y table whereby said diagram will provide the proper color when $x$ of the table equals $X/(X+Y+Z)$ and $y$ of the table equals $Y/(X+BvzZ)$ where $X$ is the amount or red, $Y$ the amount of green and $Z$ the amount of blue sensed by said sensing means.

6. The invention according to claim 5 and further including a neutral density filter, having a density which varies as a function of position, interposed in said projection path, and means to control the position of said filter in accordance with the total of all light sensed by said sensing means.

7. The invention according to claim 6 wherein said filter is in the form of a disk with its density varying as a function of angle and said position control means comprise a position servo adapted to rotate said disk.

8. The invention according to claim 3 wherein said means to provide said sensed color comprise:

a. red, green and blue light sources;

b. variable neutral density filters interposed in the paths of said light sources;

c. means to control the density of said filters as a function of the color sensed by said sensing means; and d. means to combine the light from said sources for projection on said monochromatic display.

9. The invention according to claim 8 wherein said filters are disks having a density which is a function of angle, said control means are position servos controlling the angular position of said disks and said combining means comprise beam splitters.

10. The invention according to claim 3 wherein said sensing means comprise:

a. a first beamsplitter placed in the projection path of said high resolution display arranged to direct a portion of the light in a first deflected path essentially perpendicular to the axis of said projection path;

b. a red dichroic mirror placed in said first deflected path and arranged to deflect red light in a second deflected path;

c. a green dichroic mirror placed in said first deflected path and arranged to deflect green light in a third deflected path;

d. a blue dichroic mirror placed in said first deflected path and arranged to deflect blue light in a fourth deflected path; and e. first, second and third photo-multipliers arranged to intersect respectively said second, third and fourth deflected paths whereby the outputs of said photomultipliers will respectively indicate the amounts of red, green and blue light.

11. The invention according to claim 10 and further including a second beam splitter interposed in said first deflected path between said first beamsplitter and said dichroic mirrors to deflect a portion of the total light along a fifth deflected path and a fourth photomultiplier arranged to intersect said fifth deflected path to develop an output corresponding to said total light.

12. The invention according to claim 11 and further including first, second, third and fourth lenses interposed in said second, third, fourth and fifth deflected paths to image the light in said paths on said first, second, third and fourth photomultipliers.

13. The invention according to claim 2 wherein said displays are color television displays, said high resolution display having a color input and said monochromatic displays having a monochromatic input, and said sensing means comprise means to detect the red, green, and blue video signals of said high resolution color display and said means to provide said sensed color comprise first, second and third averaging means having said red, green and blue video signals as an input and providing color outputs to said monochromatic displays which are the average of each of the respective inputs.

14. The invention according to claim 13 wherein said output is the average color for a single horizontal line on said high resolution display.

15. The invention according to claim 14 wherein each of said averaging means comprise:

a. an integrator having a respective one of said video signals as an input;

b. a sample and hold circuit connected to the output of said integrator and having an output to be provided to said monochromatic displays; and c. means to reset said integrator once during each horizontal line and to cause said sample and hold circuit to hold the integrated value present at the time of each reset.

16. The invention according to claim 15 wherein said reset is activated by horizontal blanking, whereby a whole line will be integrated.

17. The invention according to claim 15 wherein said reset is activated by a signal set to occur a predetermined time after start each of horizontal scan, whereby only a portion of each line will be integrated.

* * * * *